United States Patent Office 3,425,757
Patented Feb. 4, 1969

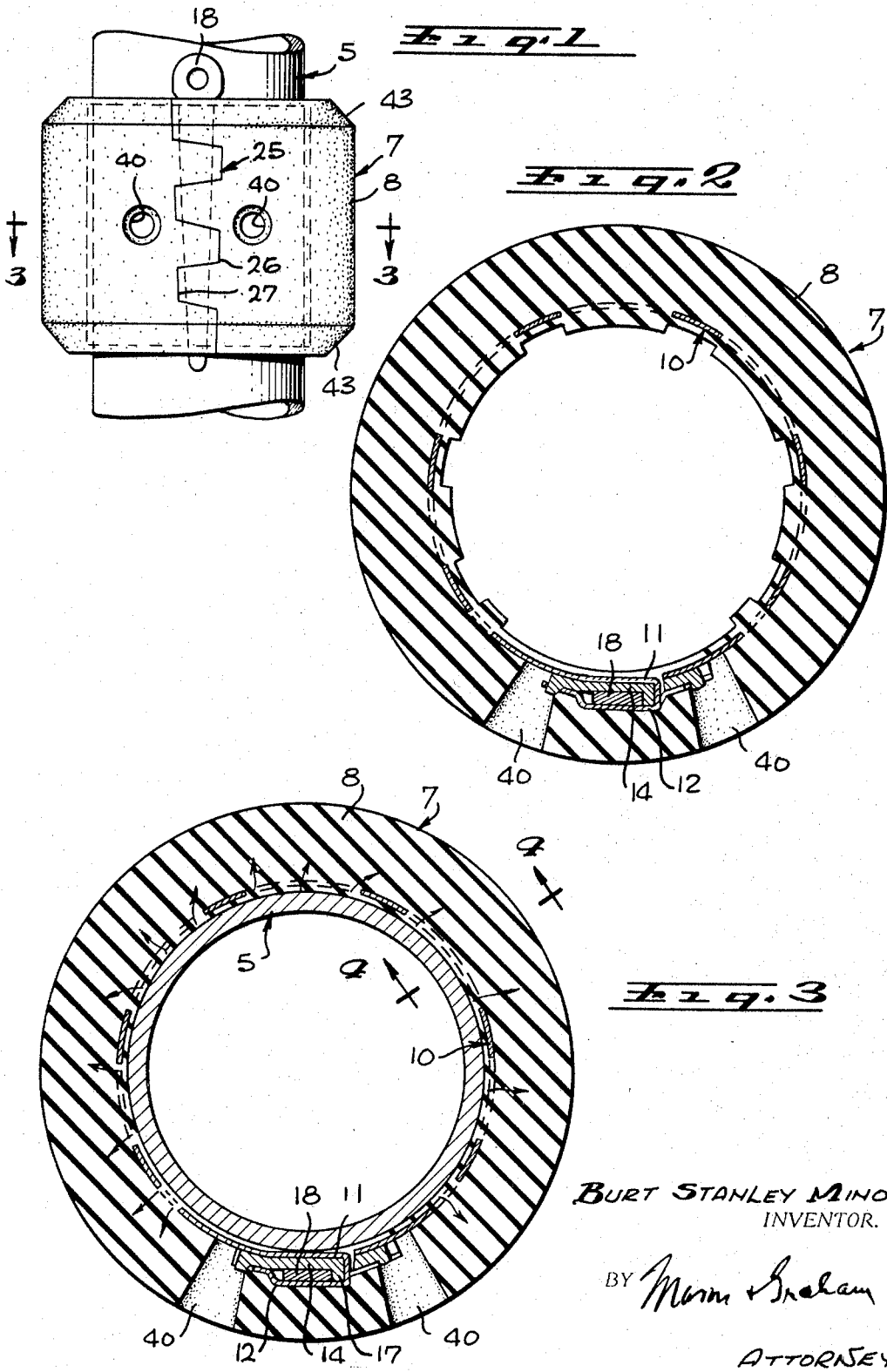

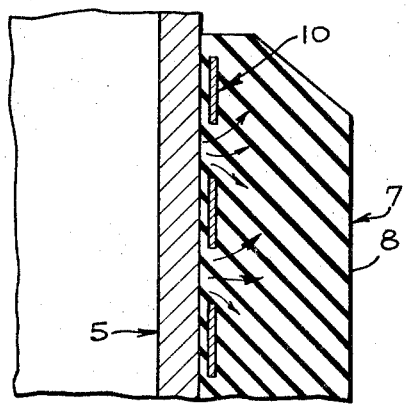
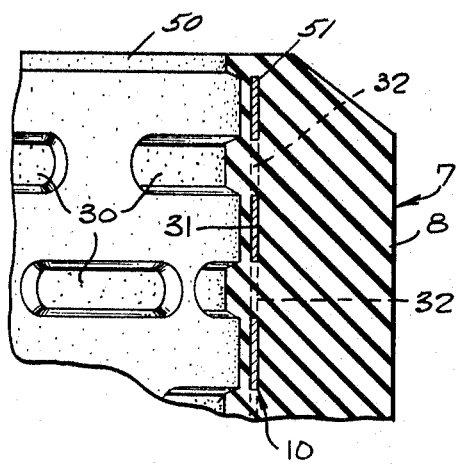
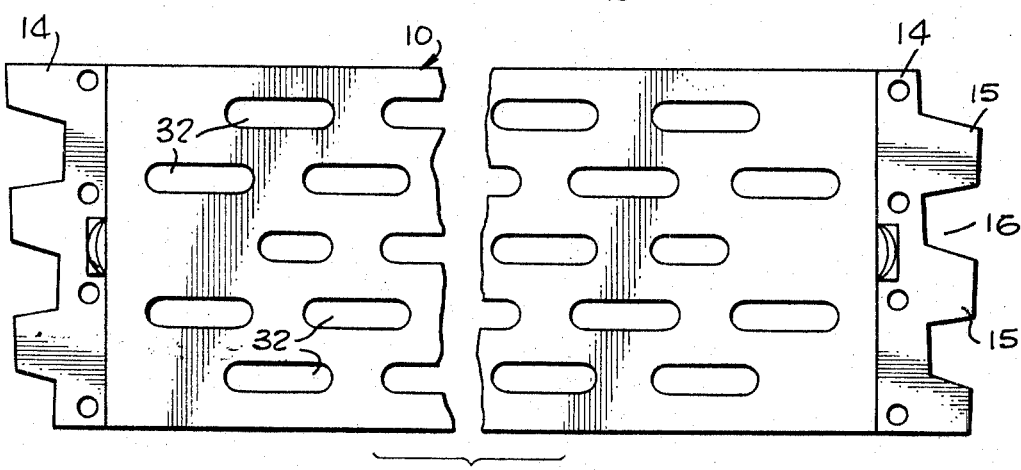

3,425,757
SPLIT DRILL PIPE PROTECTOR
Burt Stanley Minor, 1811 E. Kanola Road,
La Habra, Calif. 90631
Continuation-in-part of application Ser. No. 490,878,
Sept. 28, 1965. This application Jan. 17, 1968, Ser.
No. 698,472
U.S. Cl. 308—4     3 Claims
Int. Cl. F16c *1/26, 17/00, 21/00*

ABSTRACT OF THE DISCLOSURE

My invention is a split drill pipe protector comprising an elastomeric sleeve-like pipe encircling body having embedded therein and bonded thereto adjacent its inner surface a metallic reinforcing band incorporating means for constricting the band and body about a pipe; and is characterized by making the portion of said body inwardly of said band to present a plurality of laterally spaced pipe engaging boss portions and by providing corresponding openings through said band in register with and directly behind said respective boss portions.

---

This application is a continuation-in-part of my copending application Ser. No. 490,878, filed Sept. 28, 1965, now abandoned.

In the drilling of deep bore holes, such as in oil well drilling, the bore holes are drilled to such depths that a drill stem or pipe, during rotation, tends to whip laterally into abrasive engagement with the metal casing which lines the drill hole. It is customary to prevent such abrasive engagement between the drill pipe and well casing by means of a pipe protecting device constricted or tensioned about the drill pipe.

The tensioning of the protector about the pipe compresses the inner elastomeric layer of the protector between the drill pipe and the metallic reinforcing band of the protector, thereby to effect the frictional engagement with the drill pipe relied upon to prevent relative slippage between the pipe and protector. This compression of the inner layer between the pipe and metallic reinforcing band necessarily causes cold flow or extrusion of some of the elastomeric material. In prior protectors, since the band bars cold flow or extrusion directly radially through the reinforcing band, the material becomes compressed in a thin layer between the pipe and band. I have found that this results in the inner layer being compressed in excess of its maximum modulus of elasticity and it soon deteriorates by loss of elasticity, reiliency and recovery capabilities, allowing the protector to slip on the pipe.

It is an object of my invention to provide a protector so designed and constructed as to obtain and maintain the desired frictional engagement between the protector and the drill pipe without deteriorating the inner layer of elastic material of the protector; a more particular object being to so construct the elastomeric body and its metallic reinforcing band as to permit cold flow or extrusion of the compressed inner layer directly radially outwardly through the reinforcing band in a manner to avoid compressing the layer to an extent which exceeds the maximum modulus of its elasticity.

It is also an object of my invention to provide a protector so constructed as to allow for such cold flow or extrusion of the elastomeric material as occurs when the protector is in use in a drilling operation, as will maintain the elastomeric material alive so that, at the high temperatures normally prevailing in an oil drilling operation, the elastomeric material will not become set and lose its elasticity, resiliency or recovery capabilities.

In general, I achieve my objects by so molding and shaping the inner layer of the elastomeric material inwardly of the reinforcing band as not only to concentrate the compressive forces at laterally spaced points but also to provide passageways through the reinforcing band in register with and directly behind those points of concentration.

In a more particular adaptation of my invention, I achieve those purposes by so molding and shaping the protector as to provide, inwardly of the reinforcing band, an inner layer of elastomeric material comprising a plurality of spaced pipe-engaging boss portions and intervening web-like portions, and by providing, through the reinforcing band, openings in register with and directly behind the respective boss portions. Thus the application of the pressure for obtaining the necessary frictional engagement between the protector and drill pipe is concentrated in those bosses and the cold flow of elastic material resulting from said compression passes directly outwardly through the openings into the layer of the material radially outwardly of the reinforcing band, thus preventing the compression and sidewise extrusion of the bosses beyond their elastic limits.

Without intending thereby to limit the novel aspects of my invention, I shall, by reference to the accompanying drawings, specifically describe one of its presently preferred embodiments. In those drawings:

FIG. 1 is a side elevational view of my improved protector resiliently constricted about a conventional drill pipe;

FIG. 2 is an enlarged cross sectional view of my protector shown apart from the drill pipe;

FIG. 3 is an enlarged cross sectional view taken on line 3—3 of FIG. 1;

FIG. 4 is an enlarged fragmentary view taken on line 4—4 of FIG. 3;

FIG. 5 is an enlarged fragmentary view of my protector showing some portions in inside elevation and a portion in section; and FIG. 6 is a broken-away plan view of the metallic reinforcing band of my protector.

Referring now to the drawings, 5 denotes a conventional drill pipe such, for instance, as is used in the drilling of an oil well. 7 generally denotes my split protector, which is adapted to be laterally applied to the pipe and latched in position constricted thereabout.

The protector 7 comprises an annular, axially split, sleeve-like body 8 of elastomeric material such as natural or synthetic rubber compositions, many of which are well known in the art. Embedded in and bonded to the body is an axially split metallic reinforcing band 10.

At the split, the marginal portions 11 of the band are backwardly bent and looped, as shown at 12, about the respective metallic reinforcing inserts 14 which have, extended across the split, opposite, staggered, interengaging fingers and recess portions 15, 16 respectively; the outer end portion 17 of each of the fingers being bent radially outwardly to provide a lug 17 to be engaged by the metallic latch key 18 when it is inserted in the keyway shielded by the looped marginal portions 11. The elastomeric body 8 also has marginal integral extension portions 25 providing oppositely disposed staggered fingers 26 and recesses 27 which interengage with each other across the split. The looped marginal portions 11 of the band 10 register with and are embedded in and bonded to the extension portions 25 of the body.

Preferably the reinforcing band 10 is positioned relatively closer to the inner periphery of the body than to the outer periphery thereof, so that the relatively thicker layer of elastomeric material is outwardly of the band.

In its presently preferred form, my protector is characterized by having its pipe-engaging inner surface portion defined by a plurality of laterally spaced circumferentially elongated boss portions 30 and intervening relatively thin web-like portions 31, so that, as the protector is constricted and tensioned about the drill pipe, the bosses 30, as well as the web portions 31, become compressed between the drill pipe 5 and the reinforcing band 10, the compression of the bosses being substantially greater than the compression of the webs. And a plurality of elongated openings 32 are provided through the reinforcing band 10 directly behind and in register with the respective boss portions 30. By virtue of this constriction, the flow of elastomeric material caused by the compression of the bosses between the drill pipe and the band, may freely and directly pass through the openings in the band into the relatively thicker outer layer of elastic material, and thereby not only eliminate the possibility of compressing the material of the bosses beyond their elastic limits, but also to maintain the material alive by such intermittent backflow as might be caused by the drill pipe, during its rotation in the drill hole, whipping the protector into abrasive engagement with the casing.

Thus, at all times, the full elasticity, resiliency and recovery characteristics of the inner layer of elastomeric material remain undiminished, and the same protector may continue to be used either on the same drill pipe or it may be reinstalled and used on another drill pipe.

To enable the protector to be properly tensioned about the pipe by the use of a conventional tensioning tool, registering holes 40 are provided through the outer layer of the elastomeric material and the band, to pass the jaws of a tensioning tool (not shown).

In drilling oil wells, it often occurs that, because of varying drill pipe manufacturing tolerances or imperfections, the pipe is undersized, and the muds, gases and other corrosive elements present in the well will seep into or be drawn into the protector between its ends and the drill pipe, resulting in the metallic reinforcing band and the latching means carried by the ends of the band at the longitudinal split being exposed to the corrosive elements. Also the mud, having high lubricating qualities, will cause slippage of the protector if the tension is relatively loose on the drill pipe. I have found that by providing an elastic seal between the inner surface of the ends of the protector, the entry of those corrosive elements may be prevented. In FIG. 5 of the drawing I show such sealing elements in the form of annular elastomeric drill stem engaging lips 50 at the ends of the body 8. Preferably the inner or pipe-engaging surfaces of the lips 50 are coplanar with the pipe-engaging inner surfaces of the respective bosses 30; the lips being formed in the elastomeric body beyond the respective ends 51 of the reinforcing band.

The respective ends of the body preferably are tapered as shown at 43.

I claim:
1. A device for protecting a metallic drill pipe against metal-to-metal contact with a metallic drill hole casing, comprising an annular, longitudinally-split, pipe-encircling body of eastomeric material having a relatively thin inner layer composed of spaced inwardly-projecting, pipe-engaging boss portions and intervening web-like portions, and a relatively thick outer layer of relatively greater modulus of elasticity; a longitudinally split annular metallic reinforcing band disposed between and bonded to said layers; said body being of a normal unstressed internal diameter greater than the outside diameter of said pipe; means along said split in said band for maintaining said body in tension about said pipe whereby radially to compress said boss portions between said pipe and said band to maintain said boss portions in frictional engagement with said pipe; and means for maintaining said frictional engagement of said boss portions with said pipe without said radial compression exceeding the modulus of elasticity of said boss portions, comprising spaced openings through said band directly radially opposite and in register with said respective boss portions, whereby to pass the extrusion of said elastomeric material of said boss portions resulting from said radial compression into said outer layer against the opposing force of the relatively greater modulus of elasticity of said outer layer.

2. The device of claim 1 wherein the respective openings through the metallic reinforcing band conform in width and length to the cross-sectional width and length dimensions of the respective bosses.

3. The device of claim 1 wherein each end portion of the elastomeric body has an annular elastomeric inwardly-disposed pipe-engaging lip beyond the respective ends of said metallic reinforcing band.

References Cited

UNITED STATES PATENTS

| | | |
|---|---|---|
| 1,965,998 | 7/1934 | Williams. |
| 2,002,893 | 5/1935 | Holt. |
| 2,380,715 | 7/1945 | Aker. |
| 2,251,428 | 8/1951 | Smith. |
| 2,897,016 | 7/1959 | Baker. |
| 3,051,532 | 8/1962 | Collett. |
| 3,054,646 | 9/1962 | Minor. |
| 3,094,360 | 6/1963 | Collett. |
| 3,147,963 | 9/1964 | Frazier. |

MARTIN P. SCHWADRON, *Primary Examiner.*

LUCIOUS L. JOHNSON, *Assistant Examiner.*

U.S. Cl. X.R.

287—111